(12) United States Patent
Worley, III et al.

(10) Patent No.: US 9,007,473 B1
(45) Date of Patent: Apr. 14, 2015

(54) ARCHITECTURE FOR AUGMENTED REALITY ENVIRONMENT

(75) Inventors: William Spencer Worley, III, Half Moon Bay, CA (US); William Thomas Weatherford, San Mateo, CA (US); Christopher Coley, Morgan Hill, CA (US); Edward Dietz Crump, Santa Cruz, CA (US)

(73) Assignee: Rawles LLC, Wilmington, DE (US)

( * ) Notice: Subject to any disclaimer, the term of this patent is extended or adjusted under 35 U.S.C. 154(b) by 390 days.

(21) Appl. No.: 13/075,948

(22) Filed: Mar. 30, 2011

(51) Int. Cl.
*H04N 5/232* (2006.01)
*H04N 13/00* (2006.01)
*G06F 15/16* (2006.01)
*H04N 21/2347* (2011.01)

(52) U.S. Cl.
CPC ................................ *H04N 21/2347* (2013.01)

(58) Field of Classification Search
USPC ............ 348/42, 115, 207.11, 211.11, 211.12, 348/211.1, 211.3, 211.99, 744; 709/217
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2004/0239776 | A1* | 12/2004 | Shinohara et al. ............ 348/239 |
| 2010/0257252 | A1* | 10/2010 | Dougherty et al. ......... 709/217 |
| 2011/0213664 | A1* | 9/2011 | Osterhout et al. ......... 705/14.58 |
| 2012/0223885 | A1* | 9/2012 | Perez ............................ 345/158 |

FOREIGN PATENT DOCUMENTS

WO     WO2011088053 A2     7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

\* cited by examiner

*Primary Examiner* — Trung Diep
(74) *Attorney, Agent, or Firm* — Lee & Hayes, PLLC

(57) ABSTRACT

An architecture has one or more systems for generating augmented reality environments configured to access cloud services over a network. A user is authenticated within the environments, and once authenticated is permitted to interact with the cloud services using the augmented reality environments as well as client resources provided within the environments. The client resources may include devices or things that are primary intended for use within the environments, and devices or things that are not typically associated with augmented reality environments. The architecture enables the client resources to function as thin client interfaces to the cloud services.

37 Claims, 7 Drawing Sheets

US 9,007,473 B1

ARCHITECTURE FOR AUGMENTED REALITY ENVIRONMENT

BACKGROUND

Augmented reality allows interaction among users, real-world objects, and virtual or computer-generated objects and information within an augmented reality environment. Within the augmented reality environment, images may be presented on various objects and users may interact with the images and/or objects in a number of ways. However, maintaining images on these objects, receiving input from a user's interaction with these objects, and so forth often pose challenges. What is desired is an augmented reality environment where essentially any type of device or object may become part of the environment and useable for interaction with users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments may be resource intensive, including resources such as cameras, projectors, computing devices with processing and memory capabilities, and so forth. In addition to these resources used to define the augmented reality environments, other devices or objects may be present within an environment that may, at times, be used in some manner to further facilitate user interaction within the augmented reality environment. For example, a room that is equipped to provide an augmented reality environment may also include other devices that are not typically nor intended to be part of the environment. Such devices may range widely in functionality and capabilities, with example devices being televisions, computers, portable devices (phones, PDAs, tablets, etc.), limited-functioning clients (i.e., clients with limited processing and/or memory capabilities), passive devices (i.e., devices that can provide some functionality either mechanically or under power from an external source) and even non-electronic devices (e.g., surface, pad, etc.).

Described herein is an architecture to create augmented reality environments (ARE) and leverage other non-ARE resources that may be available within the environments to further extend users' abilities to interact within the environments. Within this architecture, the system used to create the augmented reality environment is connected to networking and computing resources, such as cloud services, which are external to the system. Certain types of non-ARE resources may be connected to cloud services as well, allowing those resources to be leveraged to further enhance the augmented reality environment.

The architecture may be implemented in many ways, several examples of which are described below. The following discussion begins with a description of the system used to create an augmented reality environment, and then proceeds with a description of an integrated architecture involving ARE resources and non-ARE resources.

Illustrative Environment

Figure 1:
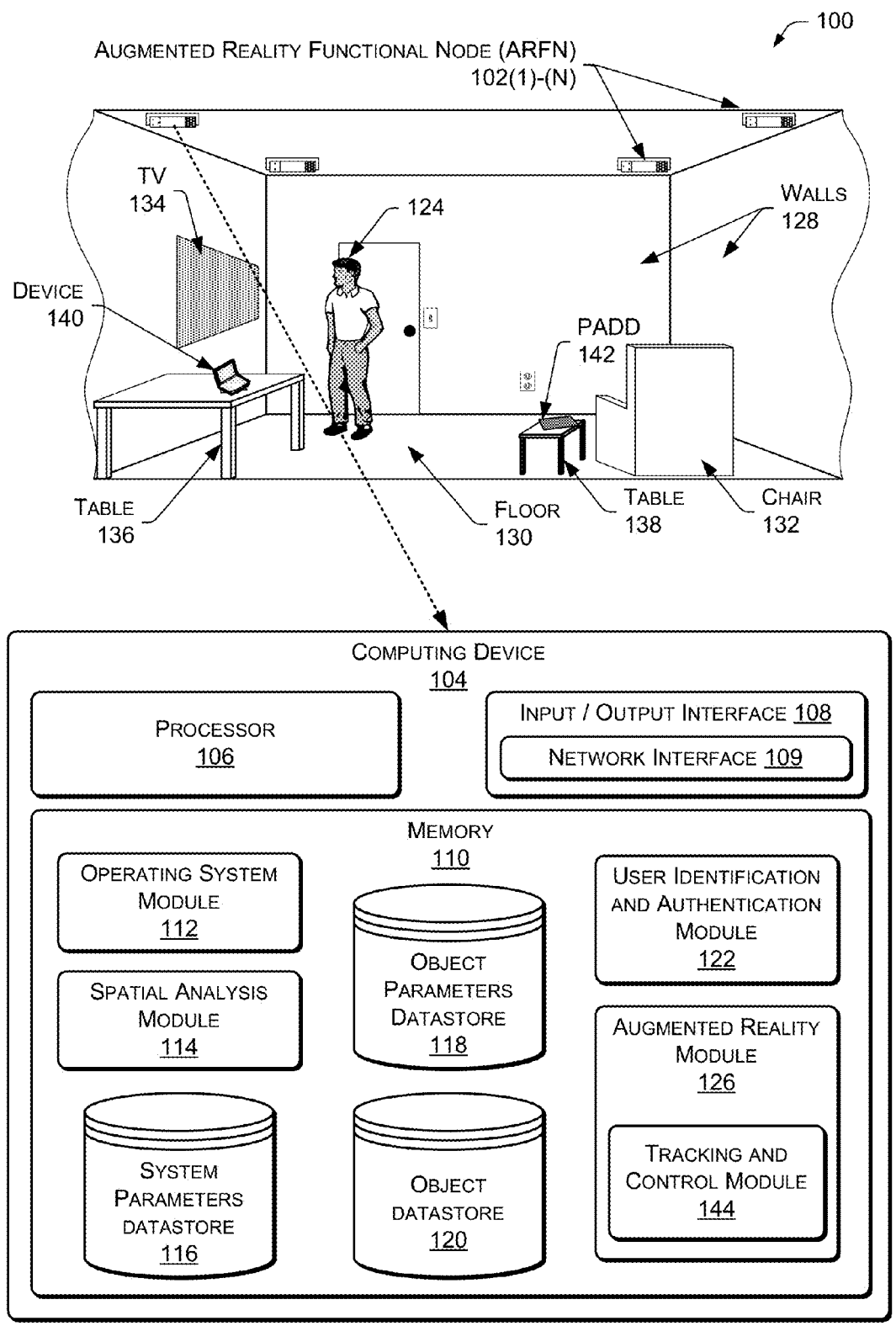
FIG. 1 shows an illustrative scene with an augmented reality environment set in an exemplary room. The augmented reality environment (ARE) is provided, in part, by an augmented reality functional node (ARFN) located in the scene and associated computing device. ARE items and non-ARE items are also illustrated in this scene, many of which are configured to interact with the ARFN.

FIG. 1 shows an illustrative augmented reality environment 100 which includes an augmented reality functional node (ARFN) 102 with associated computing device 104. In this illustration, multiple ARFNs 102 are positioned around the scene, in this case a room. In other implementations, a single ARFN 102 may be used and positioned in any number of arrangements, such as on the ceiling, in a lamp, on the wall, and so forth. One implementation of the ARFN 102 is provided below in more detail with reference to FIG. 2.

The ARFN 102 is coupled to the computing device 104, which may be located within the environment 100 or disposed at another location. The ARFN may be connected to the computing device 104 via a wired network, a wireless network, or a combination of the two. The computing device 104 has a processor 106, an input/output interface 108, and a memory 110. The processor 106 may include one or more processors configured to execute instructions. The instructions may be stored in memory 110, or in other memory accessible to the processor 106, such as storage in the cloud.

The input/output interface 108 may be configured to couple the computing device 104 to other components, such as projector, cameras, microphones, other ARFNs 102, other computing devices, and so forth. The input/output interface 108 may further include a network interface 109 that facilitates connection to a remote computing system, such as cloud computing resources. The network interface 109 enables access to one or more network types, including wired and wireless networks. More generally, the coupling between the computing device 104 and any components may be via wired technologies (e.g., wires, fiber optic cable, etc.), wireless technologies (e.g., RF, cellular, satellite, Bluetooth, etc.), or other connection technologies.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instruction, datastores, and so forth may be stored within the memory 110 and configured to execute on a processor, such as the processor 106. An operating system module 112 is configured to manage hardware and services within and coupled to the computing device 104 for the benefit of other modules.

A spatial analysis module 114 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, the examples in this disclosure refer to structured light. The spatial analysis module 114 provides the information used within the augmented reality environment to provide an interface between the physicality of the scene and virtual objects and information.

A system parameters datastore 116 is configured to maintain information about the state of the computing device 104, the input/output devices of the ARFN 102, and so forth. For example, system parameters may include current pan and tilt settings of the cameras and projectors. As used in this disclosure, the datastore includes lists, arrays, databases, and other data structures used to provide storage and retrieval of data.

An object parameters datastore 118 in the memory 110 is configured to maintain information about the state of objects within the scene. The object parameters may include the surface contour of the object, overall reflectivity, color, and so forth. This information may be acquired from the ARFN 102, other input devices, or via manual input and stored within the object parameters datastore 118.

An object datastore 120 is configured to maintain a library of pre-loaded reference objects. This information may include assumptions about the object, dimensions, and so forth. For example, the object datastore 120 may include a reference object of a beverage can and include the assumptions that beverage cans are either held by a user or sit on a surface, and are not present on walls or ceilings. The spatial analysis module 114 may use this data maintained in the datastore 120 to test dimensional assumptions when determining the dimensions of objects within the scene. In some implementations, the object parameters in the object parameters datastore 118 may be incorporated into the object datastore 120. For example, objects in the scene which are temporally persistent, such as walls, a particular table, particular users, and so forth may be stored within the object datastore 120. The object datastore 120 may be stored on one or more of the memories of the ARFN 102, storage devices accessible on the local network, or cloud storage accessible via a wide area network.

A user identification and authentication module 122 is stored in memory 110 and executed on the processor(s) 106 to use one or more techniques to verify users within the environment 100. In this example, a user 124 is shown within the room. In one implementation, the ARFN 102 may capture an image of the user's face and the spatial analysis module 114 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 122 can then match the reconstructed images (or other biometric parameters) against a database of images (or parameters), which may be stored locally or remotely on a storage system or in the cloud, for purposes of authenticating the user. If a match is detected, the user is permitted to interact with the system.

In some implementations, multiple levels of authentication may be used. For instance, authentication may involve primary user data in the form of a biometric parameter (e.g., face image, face profile, fingerprint, etc.) and secondary user data in a different form. Examples of secondary user data include, for example, a non-vocal audio command (e.g., sequence of claps, or snaps) or a detectable body movement. Secondary user data may also be confirmation that the user's cell phone, or unique identifier fob, is also present in the environment.

In another implementation, the room may be equipped with other mechanisms used to capture one or more biometric parameters pertaining to the user, and feed this information to the user identification and authentication module 122. For instance, a scanner may be mounted on the wall or embedded in the ARFN to scan the users fingerprint, or hand profile, or retina. In other implementations, the user may use verbal input and the module 122 verifies the user through an audio profile match. In still other implementations, the user may enter a pass code via a keypad or other input mechanism within the environment 100.

An augmented reality module 126 is configured to generate augmented reality output in concert with the physical environment. The augmented reality module 126 may employ essentially any surface, object, or device within the environment 100 to interact with the user 124. In this example, the room has walls 128, a floor 130, a chair 132, a TV 134, tables 136 and 138, a computing device 140, and a projection accessory display device (PADD) 142. A PADD 142 may be essentially any device for use within an augmented reality environment, and may be provided in several form factors, including a tablet, coaster, placemat, tablecloth, countertop, tabletop, and so forth. A projection surface on the PADD facilitates presentation of an image generated by an image projector, such as the projector that is part of an augmented reality functional node (ARFN) 102. The PADD may range from entirely non-active, non-electronic, mechanical surfaces to full functioning, full processing and electronic devices. Example PADDs are described in more detail with reference to U.S. patent application Ser. No. 12/977,949, which is entitled "Powered Augmented Reality Projection Accessory Display Device," and was filed on Dec. 23, 2010, and to U.S. patent application Ser. No. 12/977,992, which is entitled "Unpowered Augmented Reality Projection Accessory Display Device," and was filed on Dec. 23, 2010. These applications are hereby incorporated by reference.

Some of the things in the room may be intended to be part of the augmented reality environment (ARE) upon which images may be projected. Examples of such things may be the walls 128, floor 130, and tables 136, 138, and PADD 142. These items will be referred to as ARE items. Other things may not normally be intended to be part of the augmented reality environment. These items will be referred to generally as non-ARE items. Such non-ARE items may include the TV 134 and computing device 140. However, these non-ARE items may be temporarily used within the augmented reality environment when such devices are accessible, directly or indirectly, by the system of ARFNs 102(1)-(N) and computing devices 104.

Accordingly, the augmented reality module 126 may be used to track not only items within the environment that were previously identified by the spatial analysis module 114, and stored in the various datastores 116-120, but also the non-ARE items that reside in the environment or are ported into the environment. The augmented reality module 126 includes a tracking and control module 144 configured to track one or more ARE and/or non-ARE items within the scene and accept inputs from or relating to the ARE and/or non-ARE items.

Figure 2:
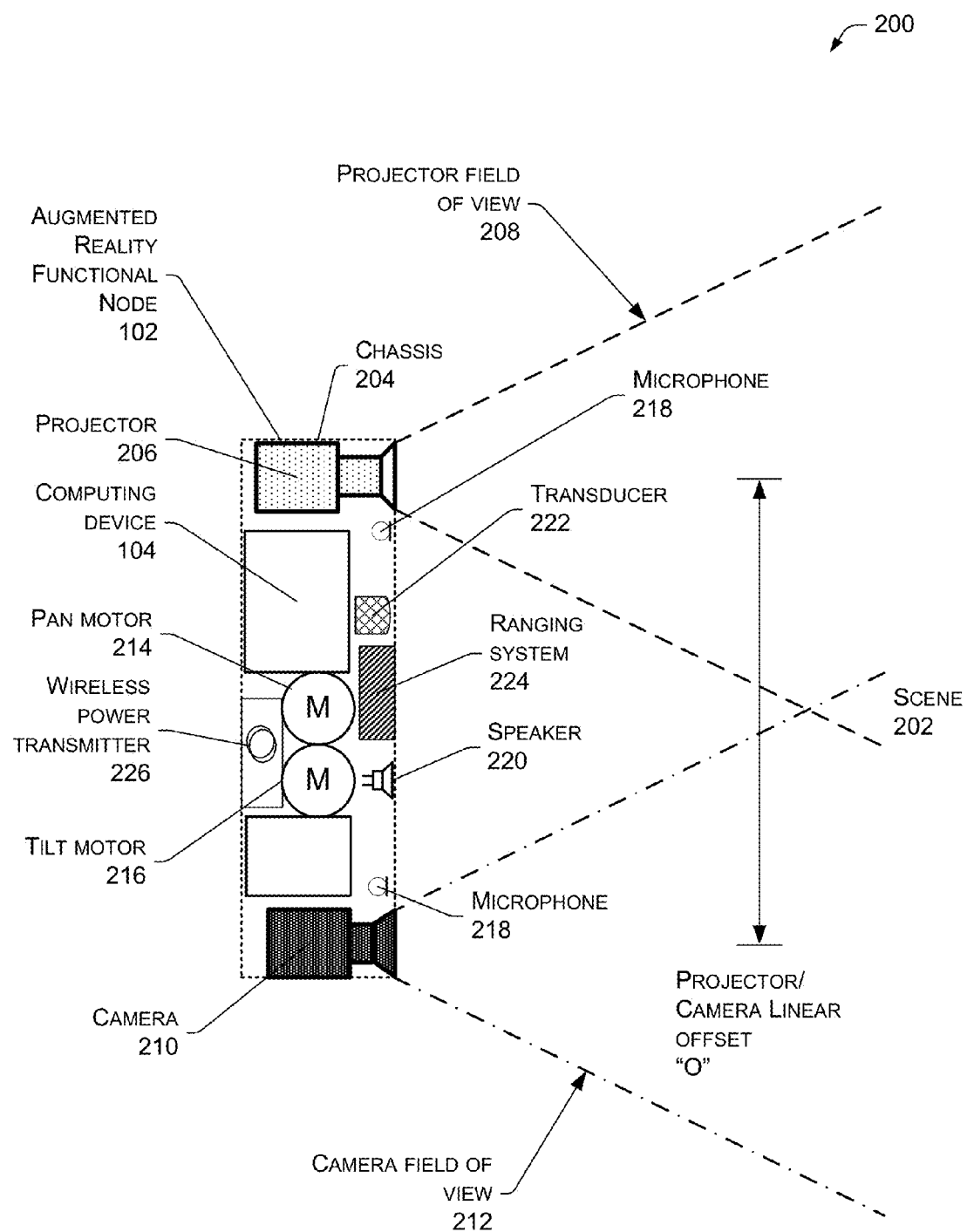
FIG. 2 shows an illustrative augmented reality functional node and computing device, along with other selected components.

FIG. 2 shows an illustrative schematic 200 of the augmented reality functional node 102 and selected components. The ARFN 102 is configured to scan at least a portion of a scene 202 and the objects therein. The ARFN 102 may also be configured to provide augmented reality output, such as images, sounds, and so forth.

A chassis 204 holds the components of the ARFN 102. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102, or elsewhere within the environment, and configured to detect and/or generate inaudible signals, such as infrasound or ultrasound. The transducer may also employ visible light, non-visible light, RF, or other ways to facilitate communication. These inaudible signals may be used to provide for signaling between accessory devices and the ARFN 102.

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components within the PADD 142. The wireless power transmitter 226 may also be configured to transmit visible light, non-visible light, RF, or other forms to communicate power. The wireless power transmitter 226 may utilize inductive coupling, resonant coupling, capacitive coupling, and so forth.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

In other implementations, the components of the ARFN 102 may be distributed in one or more locations within the environment 100. As mentioned above, microphones 218 and speakers 220 may be distributed throughout the scene. The projector 206 and the camera 210 may also be located in separate chassis 204.

Figure 3:
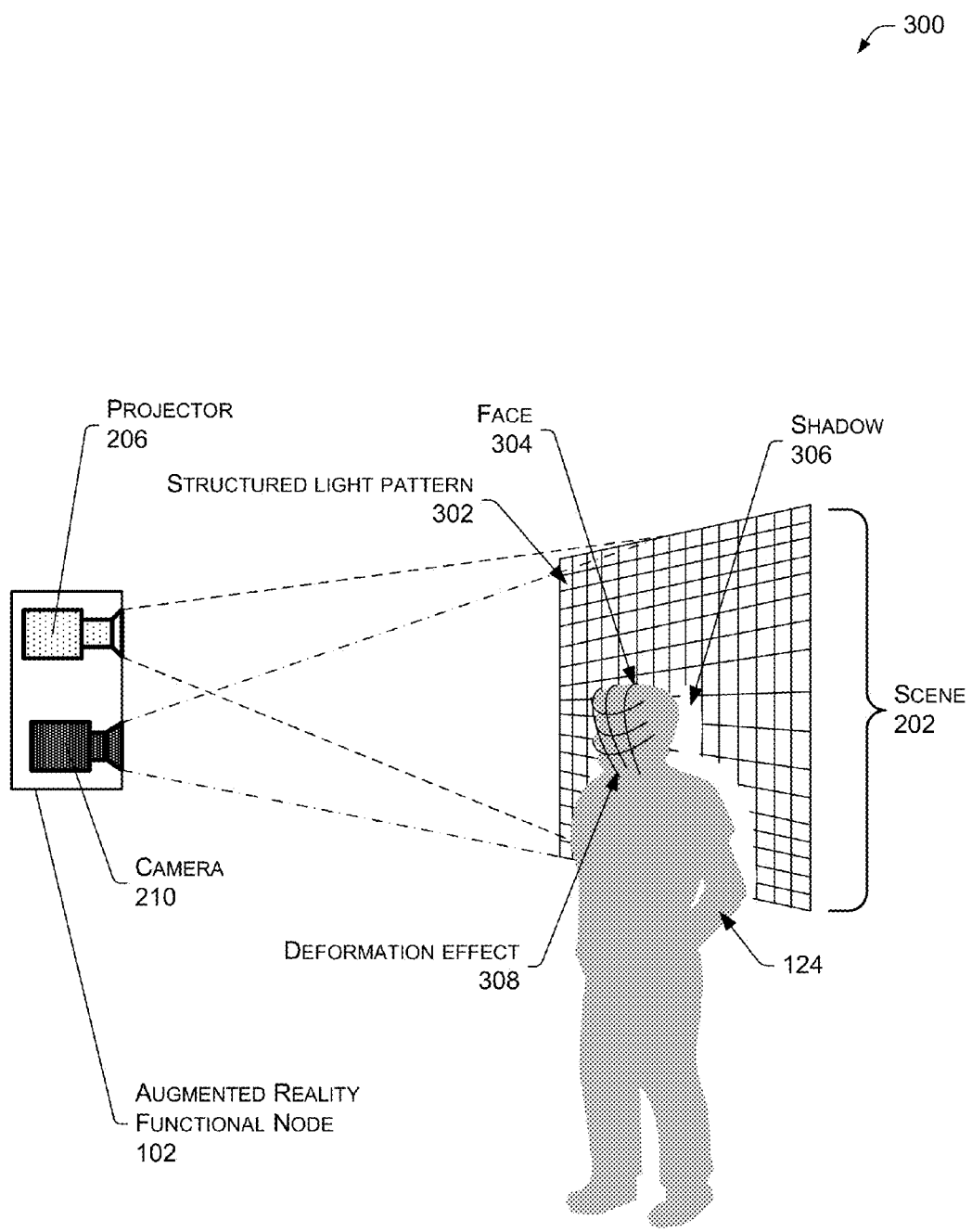
FIG. 3 illustrates the augmented reality functional node projecting a structured light pattern on a scene and receiving a corresponding image of the scene. The node may be configured to perform user identification and authentication.

FIG. 3 illustrates a structured light pattern 300 impinging on the scene 202. In this illustration, the projector 206 within the ARFN 102 projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 124 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 114 to characterize the scene 202. In some implementations, multiple cameras may be used to acquire the image. In other instances, the images of the user's face 304 (or other body contours, such as hand shape) may be processed by the spatial analysis module 114 to reconstruct 3D images of the user, which are then passed to the user identification and authentication module 122 for purposes of verifying the user.

Certain features of objects within the scene 202 may not be readily determined based upon the geometry of the ARFN 102, shape of the objects, distance between the ARFN 102 and the objects, and so forth. As a result, the spatial analysis module 114 may be configured to make one or more assumptions about the scene, and test those assumptions to constrain the dimensions of the scene 202 and maintain the model of the scene.

Illustrative Architecture

Figure 4:
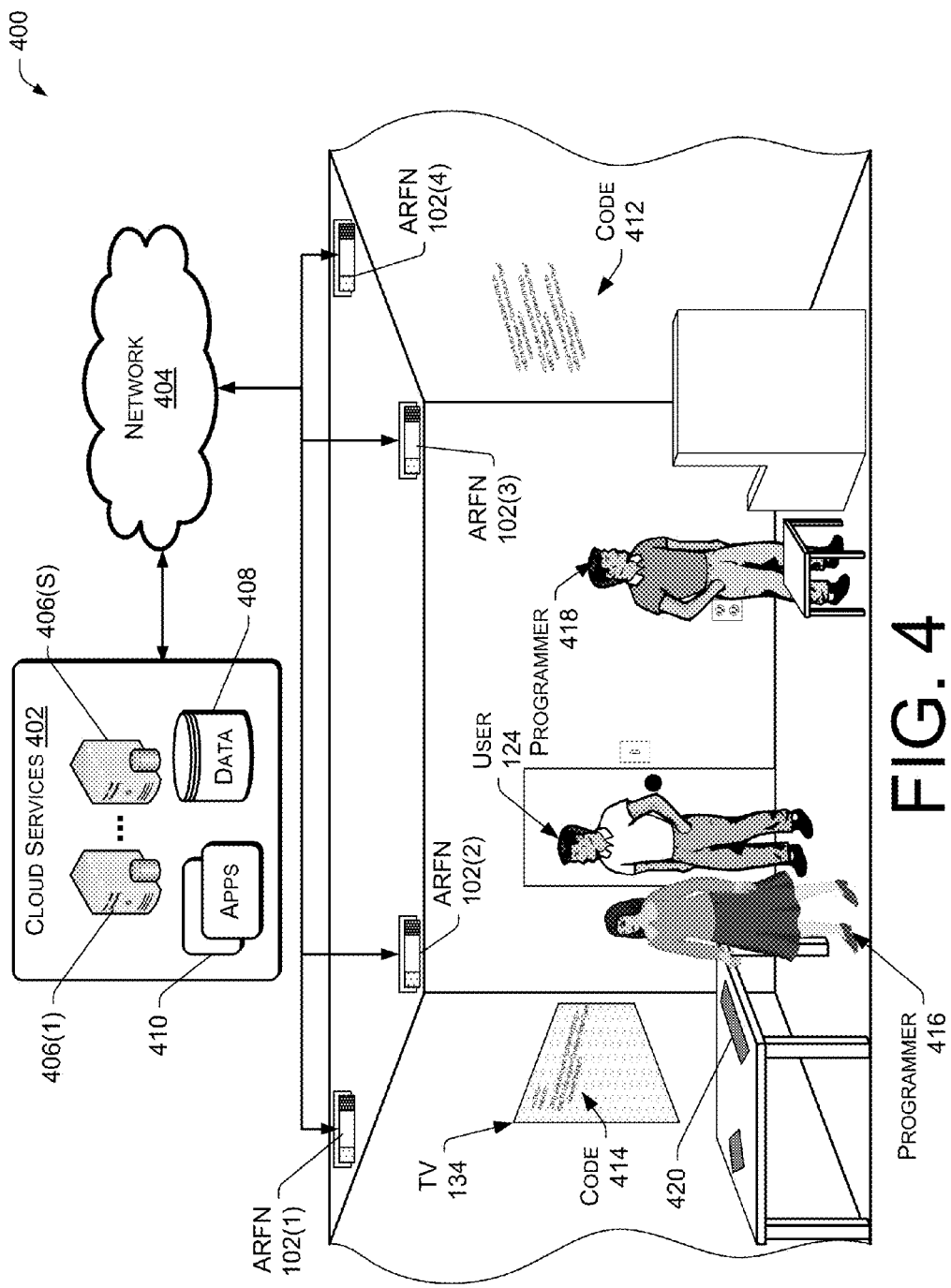
FIG. 4 shows an architecture having one or more ARFNs connectable to cloud services via a network.

FIG. 4 shows an architecture 400 in which the ARFNs 102(1)-(4) residing in the room are further connected to cloud services 402 via a network 404. In this arrangement, the ARFNs 102(1)-(4) may be integrated into a larger architecture involving the cloud services 402 to provide an even richer user experience. Cloud services generally refer to the computing infrastructure of processors, storage, software, data access, and so forth that is maintained and accessible via a network such as the Internet. Cloud services 402 do not require end-user knowledge of the physical location and configuration of the system that delivers the services. Common expressions associated with cloud services include "on-demand computing", "software as a service (SaaS)", "platform computing", and so forth.

As shown in FIG. 4, the cloud services 402 may include processing capabilities, as represented by servers 406(1)-(S), and storage capabilities, as represented by data storage 408. Applications 410 may be stored and executed on the servers 406(1)-(S) to provide services to requesting users over the network 404. Essentially any type of application may be executed on the cloud services 402. One possible application is a user identification and authentication application. This application receives user data from an augmented reality environment, and attempts to verify a specific user from that data. The user data may be an image of certain physical features, such as facial features captured by the ARFN 102. The user data may be a hand profile, or a fingerprint, or a voice file, or a retina scan, or other biometric data, or a pass code. The user data may be processed against a collection of authorized user profiles stored in the data storage 408 to determine whether this particular user should be authorized. In this manner, the cloud services 402 perform the user authentication task in addition, or as opposed, to the ARFN-resident module 122 shown in FIG. 1. Other examples of cloud services applications include sales applications, programming tools, office productivity applications, search tools, mapping and other reference applications, media distribution, social networking, and so on.

The network 404 is representative of any number of network configurations, including wired networks (e.g., cable, fiber optic, etc.) and wireless networks (e.g., cellular, RF, satellite, etc.). Parts of the network may further be supported by local wireless technologies, such as Bluetooth, ultra-wide band radio communication, wife, and so forth.

By connecting the ARFNs 102(1)-(4) to the cloud services 402, the architecture 400 allows the ARFNs 102 and computing devices 104 associated with a particular environment, such as the illustrated room, to access essentially any number of services. Consider, for instance, a scenario where the user 124 is in the process of drafting code for a particular software application. Upon entering the room, the user 124 is first authenticated using one of the techniques described above. For instance, the user's facial image is captured by one or more of the ARFNs 102(1)-(4) and processed using the facial reconstruction techniques described above with respect to FIGS. 1 and 3.

Once authenticated, the user 124 can interact with the augmented reality environment to request the code under development from the cloud services 402. The code may be projected by an ARFN 102 onto any viewable surface, such as the wall, floor, or table top. This is represented by ARFN 102(3) projecting a portion of code 412 onto the right wall. Additionally or alternatively, the architecture 400 may, at least temporarily, leverage non-ARE items, such as the TV 134, to assist in interacting with the user within the augmented reality environment. The TV 134 may be connected via a network to the cloud services 402, or alternatively, the ARFN 102 and computing device 104 may communicate with the TV through local technologies (e.g., LAN, WLAN, Bluetooth, RF, HDMI, IR, etc.). In this example, the TV is used as a display device to present another portion of code 414 that is being worked on by the user 124.

The architecture allows the user to interact more comfortably with coding tasks. This is particularly true for a team coding situation. Suppose that the user 124 is joined by two colleagues, programmers 416 and 418. The other two users 416 and 418 may be identified and authenticated upon entering the room according to the techniques described herein. In this manner, each user in the environment is uniquely verified.

Different levels of access may be implemented to take advantage of multi-user authentication. For instance, the architecture may prohibit or limit access to certain applications or information when not all users in the environment have been authenticated. Alternatively, the users may be granted different access to applications and data. For instance, one user 124 may be allowed access to view content on any surface or any device within the environment, whereas the users 416 and 418 may be given access only to the code being presented more publicly on the walls and TV.

Other access polices may allow pooling or aggregation of rights. For instance, the collection of users within the environment may be given collective access to all applications and data that are accessible by at least one authenticated user. As an example, the users play lists of music or games may be aggregated to offer a broader opportunity to enjoy entertainment as a group. Alternatively, the policy may be to allow access only to the applications and data to which all three can access individually. Further, another possible access policy is to permit use of applications and data only when a collection of the users are present. In other words, all users are present and authenticated before access is granted. This may be useful, for example, during executive or board meetings where voting quorums and the like are held.

In this case, suppose each user 124, 416, and 418 is independently authenticated prior to allowing access to, and presenting code in a viewable manner. The three programmers can comfortably team program a piece of code through the augmented reality environment. With code portion 414 presented on the TV 134 and code portion 412 projected onto the wall, the team of three programmers 124, 416, 418 may see more code and comfortably move about the room while coding. The programmers may employ any number of ways to enter new lines of code or navigate, including voice or motion commands. Alternatively, the programmers may utilize a keyboard 420 to enter code. The keyboard 420 may be a physical keyboard or an image projected onto a surface by the ARFN 102 and user input is captured by the same or different ARFN 102. As more code is entered by the programming team, that code is saved to local computing device 104 and/or to the cloud services 402.

In this coding scenario, the cloud services 402 leverages the augmented reality environment created within the room and additional resources (e.g., TV, keyboard, etc.) as clients for interacting with the users. Further, by coupling individual environments to the cloud services 402, the architecture 400 extends the augmented reality environment for the users from one scene to other scenes in other physical locations. This allows the architecture 400 to support essentially any activity at essentially any locations where an augmented reality environment may be created and the user can be identified and authenticated.

Figure 5:
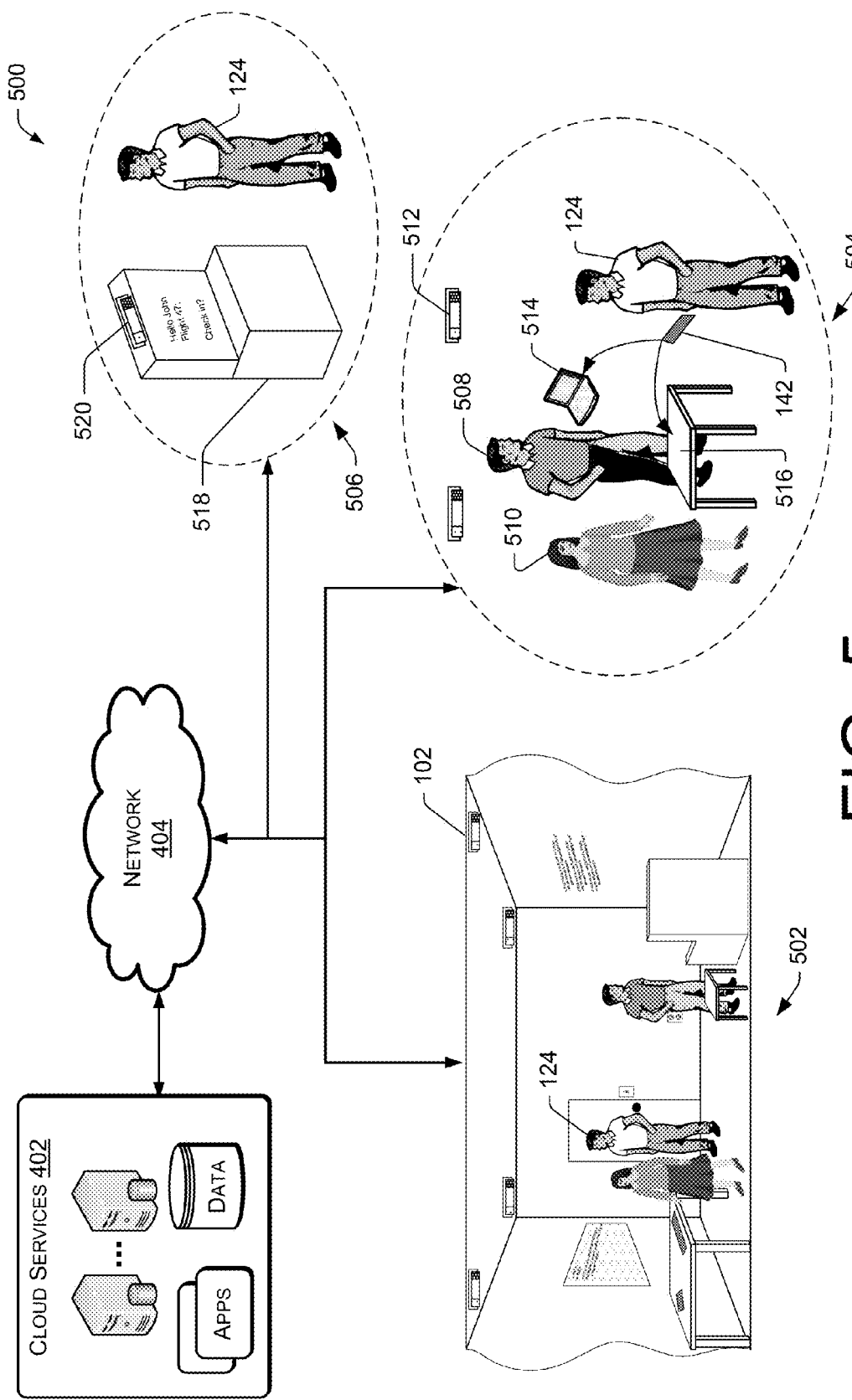
FIG. 5 illustrates a storyline of a user participating in three different scenes involving augmented reality environments. Each system used to create the augmented reality environment for the scenes is further coupled to cloud services via a network to make services and data available to the user throughout the various environments.

FIG. 5 illustrates a storyline 500 that presents three different scenes 502, 504, and 506 in which the same user interacts with services provided by the cloud services via different augmented reality environments. A first scene 502 shows the team coding scenario of FIG. 4, where the user 124 drafts software code with two colleagues. The ARFNs 102 used to create an augmented reality environment within the room are also connected to the cloud services 402 via the network 404.

After drafting code, suppose the user 124 has a meeting with two other managers 508 and 510, as represented by the second scene 504. In this scene, the user 124 is in a conference room that is at a different physical location than the room in scene 502. At this meeting, the user 124 is authenticated by the local ARFNs 512, which are also connected to the cloud services 402. Once authenticated, the user can request data from the cloud services and that data may be presented, for instance, on the user's PADD 142. The data may be projected onto the PADD 142 via one of the ARFNs 508 in the scene 504. During the meeting, the user 124 may elect to share the data kept in a file with the other managers 508, 510. These managers may individually be authenticated by the ARFNs 508 and verified to the cloud services 402. The user 124 may initiate a file transfer via a voice command or other audible signal (finger snap, clap, etc.) picked up by the microphones of the ARFNs 512, or through use of hand motion that is captured by the cameras of the ARFNs, or through other interaction techniques.

The file may be transferred in any number of ways. In one case, the cloud services 402 share the user's file with the laptop 514 of the first manager 508 via the network 404, to which the laptop 514 is connected. In another case, the data being projected onto the PADD 128 by one ARFN 512 is additionally projected onto the table surface 516 by a different ARFN for viewing by the second manager 510.

After the manager meeting in scene 504, the user departs for the airport for a business trip. In scene 506, the user 124 approaches a kiosk 518 at the airport to check-in for a flight. The kiosk 518 is equipped with a ARFN 520 that creates a local augmented reality environment proximal to the kiosk. The ARFN 520 captures the user's facial features, and submits the images to the cloud services 402 for identification and authentication. In this manner, the kiosk 518 may be a comparatively low functioning machine, relying on the cloud services 402 for processing capabilities. Once the user 124 is identified and authenticated, ticketing and gate information may be provided to the user 124.

As shown, all three scenes involve the same user 124, who is able to move freely among multiple augmented reality environments. The user may be authenticated within each scene, but once this occurs, the user is able to access the same resources (e.g., applications and data) maintained at the cloud services 402.

Figure 6:
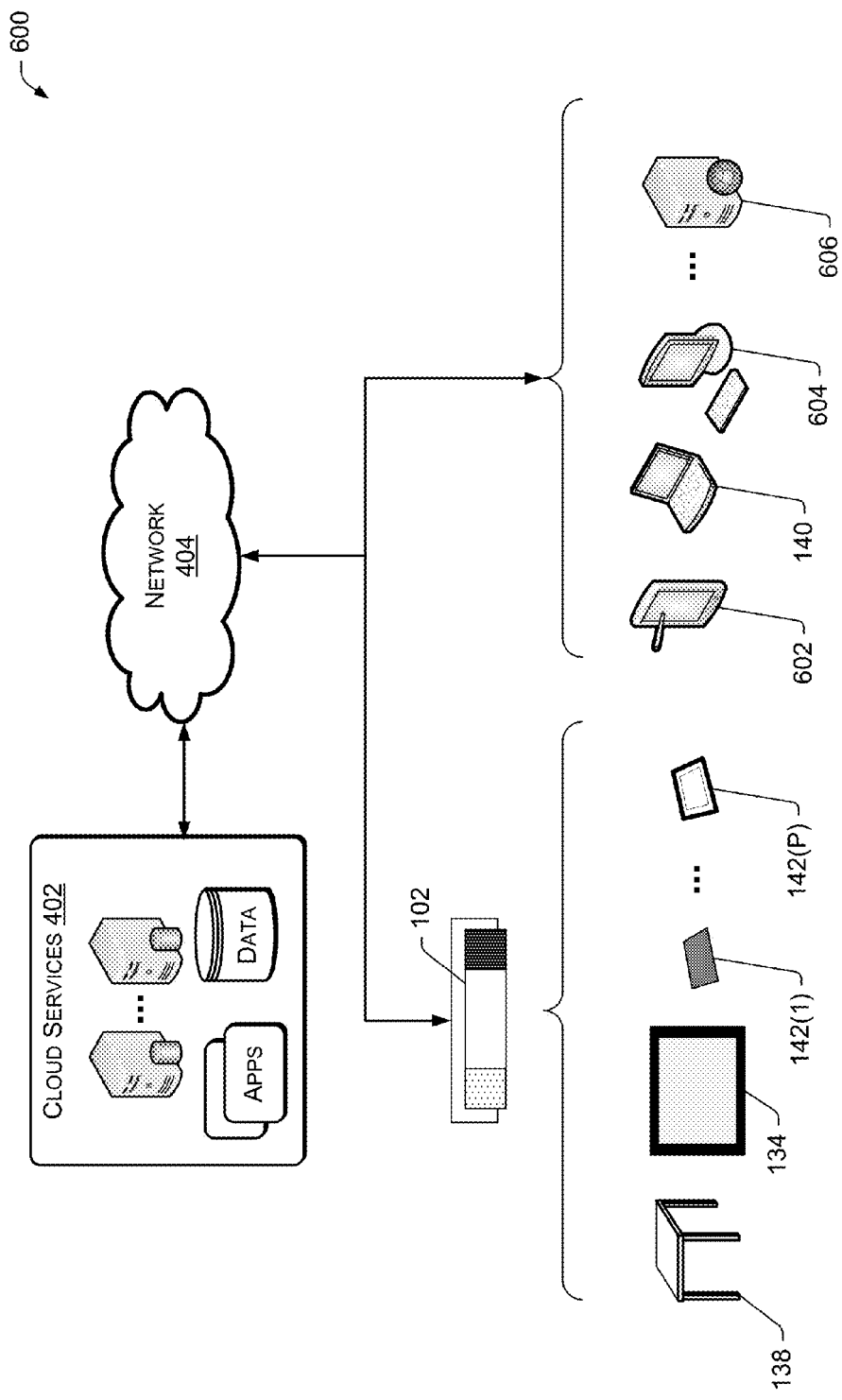
FIG. 6 illustrates an example collection of resources that may be employed in the architecture. These resources include items typically associated with an augmented reality environment and items that are typically not intended for use in such environments.

FIG. 6 illustrates an abstraction 600 of the architecture in which an augmented reality environment and any number of resources therein may be leveraged as clients to interact with applications and data provided by the cloud services 402. In this illustration, the cloud services 402 are coupled via the network 404 to a system of ARFNs, as represented by ARFN 102, and/or to resources equipped with network access capabilities. ARE resources that may be employed by the ARFN 102 include essentially any surface onto which an image may be projected and/or any device that may depict an image. Examples include the surface of table 138, the television 134, and any number of implementations of the PADD 142(1)-(P). As noted above, the PADDs may range from a simple piece of material having a projection surface, to mechanical tablet with some mechanical functionality (e.g., audible sound generation), to a low functioning electronic devices (e.g., limited memory and processing, and remotely powered), to powered electronic devices (e.g., display, processor, memory, etc), to full functioning computing devices.

The architecture may also make use of resources in the augmented reality environments that may not generally be intended for use within the environments. Such non-ARE devices may themselves be leveraged by the architecture through their connection with the cloud services 402 via the network 404 or through some form of communication with the ARFN 102. Representative non-ARE devices include a tablet 602, a portable computer 140, a desktop computer 604, and a server 606.

Illustrative Process

Figure 7:
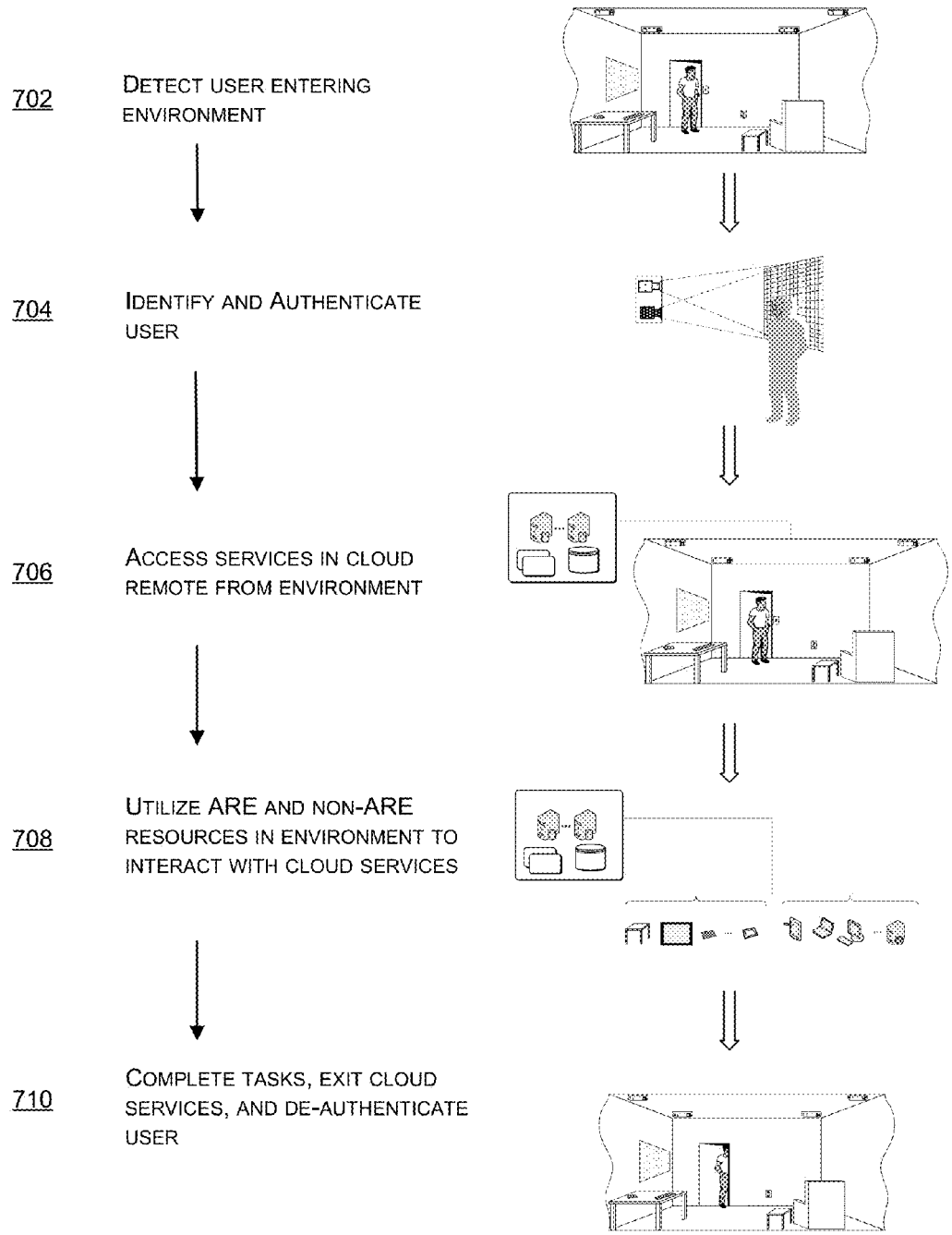
FIG. 7 is flow diagram showing an illustrative process of using an augmented reality environment and resources found therein as clients to cloud services.

FIG. 7 shows an illustrative process 700 of using an augmented reality environment and resources found therein as a client to cloud services. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 702, a user is detected upon entry to an augmented reality environment. This is represented pictorially in FIG. 7, where a user is detected entering a room equipped with one or more ARFNs. User detection may be executed by sensing disruption in the structured light pattern projected into an otherwise empty room. Other detection techniques may include motion sensing, sound reception, heat sensors, sensors on the door to the room, and so forth.

At 704, the user's identity is ascertained and authenticated. User authentication may be performed in a number of ways, including using the ARFNs to capture the image of the user's face and to verify the features as belonging to the user. Other authentication techniques include voice recognition, hand profile, finger print identification, retina scan, entry of a code, and so forth. The user authentication may be performed locally within the environment, such as by computing device 104, or remote from the environment, such as by the cloud services 402, or a combination of the two.

In another implementation, different levels of authentication may be performed locally and remotely in the cloud. For instance, the architecture may capture an image of the users face (or other biometric parameters) and perform user verification locally. Upon local verification, the user may then request a service from the remote cloud services 402 that involves a second level of authorization. For instance, the cloud services 402 may request a spoken password, a sequence of non-vocal audio inputs (e.g., sequence of claps, taps, etc.), a pass code, other non-biometric data, or any combination of these and biometric data.

In yet another implementation, the architecture may have different levels of authentication at the local or cloud level. For instance, upon entering the room, the user may speak a password for initial verification. Once resources are powered on, one or more user biometric parameters are captured and analyzed for verification purposes. If the user then requests some functionality locally or from the cloud, the user may be prompted for yet another authentication parameter that may be used alone or in combination with the others.

If multiple users are present, each user is identified and authenticated. Consider, for example, the coding scenario depicted in FIG. 4. In this case, each user 124, 416, and 418 may be authenticated prior to the system presenting code in a viewable manner. In one implementation, the system may detect the presence of a new user and suppress presentation of the images unless and until that user is authenticated as well. Further, once authenticated, each user may be given different levels of access. For instance, the users 416 and 418 may be given access solely to the code being presented on the walls and TV, whereas the user 124 may be given access to this as well as additional information provided on a PADD or other device. As another example, each user may have access to certain lists or information. When all are authenticated, the system may present an aggregation of the user lists and information for all three users to consider jointly.

At 706, once the user is authenticated, the user may interact with the augmented reality environment. As part of that interaction, the user may access the cloud services remote from the augmented reality environment. The user may request data, process data, store results, share data with others, and so forth. Any number of services available from the cloud services may be made available to the user using the ARFNs that form the augmented reality environment. For instance, a programming tool may use the ARFNs to project code onto a wall or other surface as illustrated in FIG. 4. As another example, a social networking application may organize contacts such that family members are projected onto one surface, and friends are projected onto another surface.

At 708, resources available in the environment may also be utilized to interact with the cloud services. The resources may include both items intended for use within the environment (i.e., ARE resources) and those that are not generally intended for use within the environment (i.e., non-ARE resources). The types of resources range widely, as described above with respect to FIG. 6. The resources may be used in a number of ways, including presenting information to the user through audible and/or visual output, and receiving or capturing input from the user.

At 710, once a task is completed, the user may exit the cloud services. The user may continue to interact with the augmented reality environment, engaging resources local to the environment. The user may eventually leave the environment, ending the augmented reality session. As part of exiting the cloud services or leaving the environment, the user may be affirmatively de-authenticated. For instance, the system may recognize that the user is no longer participating in the environment and effectively remove the user from an active, authenticated state. In this manner, the user would need to go through the authentication process again to be able to function within the augmented reality environment and/or gain access to the services.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   an augmented reality functional node having at least a projector and a camera for generating an augmented reality environment;
   a spatial analysis module to cause the projector to project structured light onto physical surfaces in the augmented reality environment and analyze the structured light to at least determine information about surfaces within the augmented reality environment;
   an authentication module to identify and authenticate a user as a specific user in the augmented reality environment based at least in part on a facial image captured using the camera of the augmented reality functional node, the authentication module to grant the user a privilege to at least temporarily interact with the augmented reality environment in response to identification and authentication of the user;
   a network interface to connect the augmented reality functional node to a remote computing system; and
   one or more client resources available within the augmented reality environment that, in response to use by the user, are configured to be identified and tracked by the augmented reality functional node based at least in part on the structured light that is used to determine the information about the surfaces, the one or more client resources to facilitate interaction with the remote computing system.

2. The system of claim 1, wherein the authentication module resides locally within the augmented reality environment.

3. The system of claim 1, wherein the augmented reality functional node includes a computing device, and the network interface and the authentication module are implemented by the computing device.

4. The system of claim 1, wherein the authentication module resides within the remote computing system.

5. The system of claim 1, wherein the remote computing system comprises cloud services accessible via a network.

6. The system of claim 1, wherein at least some of the client resources are separate from the augmented reality functional node and comprise passive elements with surfaces onto which images may be projected by the projector of the augmented reality functional node.

7. The system of claim 1, wherein the client resources comprise functional devices that are independently equipped to enable access to the remote computing system.

8. The system of claim 1, wherein the client resources comprise mobile communication devices.

9. The system of claim 1, wherein the user is a first user who is granted first access rights by the authentication module, and wherein the authentication module further identifies and authenticates a second user using at least the camera of the augmented reality functional node, the second user being granted second access rights by the authentication module in response to identification and authentication of the second user and while the first user maintains the first access rights.

10. The system of claim 9, wherein the second access rights are different from the first access rights.

11. A method comprising:
generating an augmented reality environment within a scene, the augmented reality environment having one or more resources available within the scene to facilitate user interaction with remote computing services;
projecting structured light onto surfaces within the augmented reality environment, the structured light detected by an imaging device enabling identification of the surfaces within the augmented reality environment;
authenticating a user within the scene based at least in part on facial imagery or profile imagery captured using the imaging device to determine an identity of the user and to determine at least one permission associated with the user, wherein the facial imagery or the profile imagery includes a three-dimensional model created from detected structured light captured by the imaging device; and
upon authentication of the user associated with the at least one permission, enabling access by the user to the remote computing services using the one or more resources available within the scene.

12. The method of claim 11, wherein the one or more resources are configured to submit requests to the remote computing services and receive results.

13. The method of claim 11, wherein the user is granted one of multiple different levels of access based on the at least one permission associated with the user.

14. The method of claim 11, wherein at least one of the resources comprises a passive surface onto which images may be projected as part of the augmented reality environment, the passive surface being disconnected and separate from the imaging device.

15. The method of claim 11, wherein at least one of the resources comprises a non-electronic device.

16. The method of claim 11, wherein at least one of the resources comprises an electronic device having at least one input component or output component.

17. The method of claim 11, further comprising detecting entry of the user into the augmented reality environment, and wherein the authenticating the user is performed in response to the detecting the entry of the user into the augmented reality environment.

18. The method of claim 11, wherein the authenticating further comprises capturing an interactive movement of the user while the user is within the augmented reality environment.

19. The method of claim 11, wherein the authenticating further comprises receiving an audible voice command from the user while the user is within the augmented reality environment.

20. The method of claim 11, wherein the authenticating further comprises receiving a non-vocal audio command from the user while the user is within the augmented reality environment.

21. The method of claim 11, wherein the authenticating further comprises authenticating first user data and second user data which is different from the first user data.

22. The method of claim 21, wherein the first user data comprises a biometric parameter and the second user data comprises data other than a biometric parameter.

23. The method of claim 21, wherein the first user data comprises a biometric parameter and the second user data comprises confirmation of presence of a device belonging to the user.

24. A method comprising:
receiving user data about a user, the user data being captured while the user is within an augmented reality environment, the user data including at least facial imagery or profile imagery captured using an imaging device;
authenticating the user based at least in part on the user data to determine an identity of the user and to determine that the user has permission to access a remote computing service, wherein the authenticating comprises at least a first level of authentication that is conducted locally within the augmented reality environment and a second level of authentication that is conducted remotely;
receiving a request from a resource that is resident in the augmented reality environment, the request being generated as a result of the authenticated user interacting with the resource within the augmented reality environment; and
serving, via the remote computing service, responsive to the request, at least one of application service or data to the resource.

25. The method of claim 24, wherein the authenticating comprises verifying the identity of the user based on the at least facial imagery or profile imagery captured using the imaging device.

26. The method of claim 24, wherein the user data further comprises a biometric parameter obtained from the at least facial imagery or profile imagery.

27. The method of claim 24, wherein the resource comprises an augmented reality environment (ARE) resource that is enabled as part of the augmented reality environment.

28. The method of claim 24, wherein the resource comprises a non-augmented reality environment (non-ARE) resource that is present within, but separate from, the augmented reality environment.

29. The method of claim 24, further comprising projecting structured light onto surfaces within the augmented reality environment, the structured light detected by an imaging device enabling identification of the surfaces within the augmented reality environment; and wherein the facial imagery or the profile imagery includes a three-dimensional model created from detected structured light captured by the imaging device.

30. The method of claim 24, further comprising assessing a level of access based on the authenticating and granting access to certain application services or data based on the access level.

31. One or more non-transitory computer-readable media storing compute-executable instructions that, when executed by one or more processors, cause the one or more processors to:
   generate an augmented reality environment within a scene that includes a first user and a second user, the augmented reality environment having one or more resources available within the scene to facilitate user interaction of multiple users with remote computing services;
   authenticate the first user within the scene based at least in part on facial imagery of the first user or profile imagery of the first user captured using an imaging device to determine an identity of the first user and to determine at least one permission associated with the first user; and
   authenticate the second user within the scene based at least in part on facial imagery of the second user or profile imagery of the second user captured using the imaging device to determine an identity of the second user and to determine at least one permission associated with the second user.

32. The one or more non-transitory computer-readable media of claim 31, wherein the at least one permission associated with the first user is different than the at least one permission associated with the second user.

33. The one or more non-transitory computer-readable media of claim 31, wherein at least one of the resources comprises a passive surface onto which images may be projected as part of the augmented reality environment, the passive surface being disconnected and separate from the imaging device.

34. The one or more non-transitory computer-readable media of claim 31, wherein at least one of the resources comprises an electronic device having at least one input component or output component.

35. The one or more non-transitory computer-readable media of claim 31, wherein the authenticating further comprises capturing an interactive movement of the first user while the first user is within the augmented reality environment.

36. The one or more non-transitory computer-readable media of claim 31, wherein the authenticating further comprises receiving at least one of an audible voice command from the first user or a non-vocal audio command caused by the first user while the first user is within the augmented reality environment.

37. The one or more non-transitory computer-readable media of claim 31, wherein the authenticating further comprises authenticating biometric data and user data which is different from the biometric data.

\* \* \* \* \*